US007393481B2

(12) United States Patent
Abe et al.

(10) Patent No.: US 7,393,481 B2
(45) Date of Patent: Jul. 1, 2008

(54) METHOD AND APPARATUS FOR ELECTRIC CLAMPING

(75) Inventors: Yuji Abe, Fujisawa (JP); Shinya Itani, Zama (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 299 days.

(21) Appl. No.: 11/399,393

(22) Filed: Apr. 7, 2006

(65) Prior Publication Data

US 2006/0228443 A1    Oct. 12, 2006

(30) Foreign Application Priority Data

Apr. 8, 2005   (JP) .............................. 2005-111757

(51) Int. Cl.
  *B29C 45/80*   (2006.01)
  *B22D 17/32*   (2006.01)
(52) U.S. Cl. .................... 264/40.5; 164/4.1; 164/151.2; 164/154.2; 164/340; 425/138; 425/150; 425/152; 425/577
(58) Field of Classification Search ................. 425/138, 425/150, 151, 152, 577, 468; 264/40.1, 40.5; 164/4.1, 137, 151.2, 154.2, 340
See application file for complete search history.

(56) References Cited

U.S. PATENT DOCUMENTS 4,986,944 A * 1/1991 Bertschi .................... 264/40.5
5,244,372 A * 9/1993 Ramsey et al. .............. 425/138
6,299,426 B1 * 10/2001 Scanlan ...................... 425/138

FOREIGN PATENT DOCUMENTS

JP      7-88616      4/1995

\* cited by examiner

*Primary Examiner*—James Mackey
(74) *Attorney, Agent, or Firm*—Pillsbury Winthrop Shaw Pittman, LLP

(57) ABSTRACT

Disclosed is a method for electric clamping, which performs a clamping process in parallel with a core-drawing-in process, avoiding damages of molds and core mechanisms and enabling secure clamping. The method comprises the steps of: setting a check point, for judging safety of the clamping process in advance, in a position that is nearer to the operational start position by a predetermined distance in the mold opening direction than a position of the movable mold when the core-drawing-in process is expected to be completed, wherein the core-drawing-in process and the clamping process proceed in parallel with each other in a straight course for reciprocating a movable mold; activating a core system and a servo-motor to start an operation to draw a core into a cavity in parallel with an operation to move the movable mold in the mold closing direction; detecting whether or not the movable mold reaches the check point; judging whether or not the core reaches the position in which the core is fully drawn into the cavity at a point of time at which the movable mold reaches the check point, and confirming the completion of the core-drawing-in process. Thereafter, the clamping process of the molds is further continued if confirming that the core-drawing-in process is already completed.

12 Claims, 4 Drawing Sheets

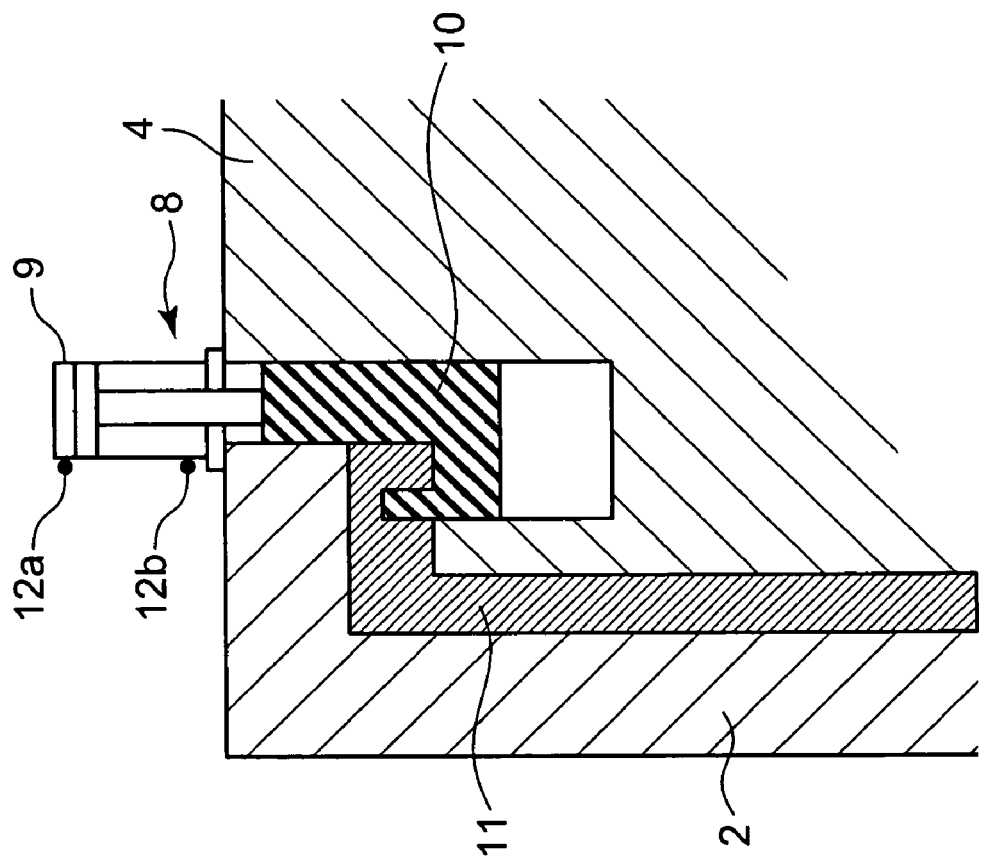
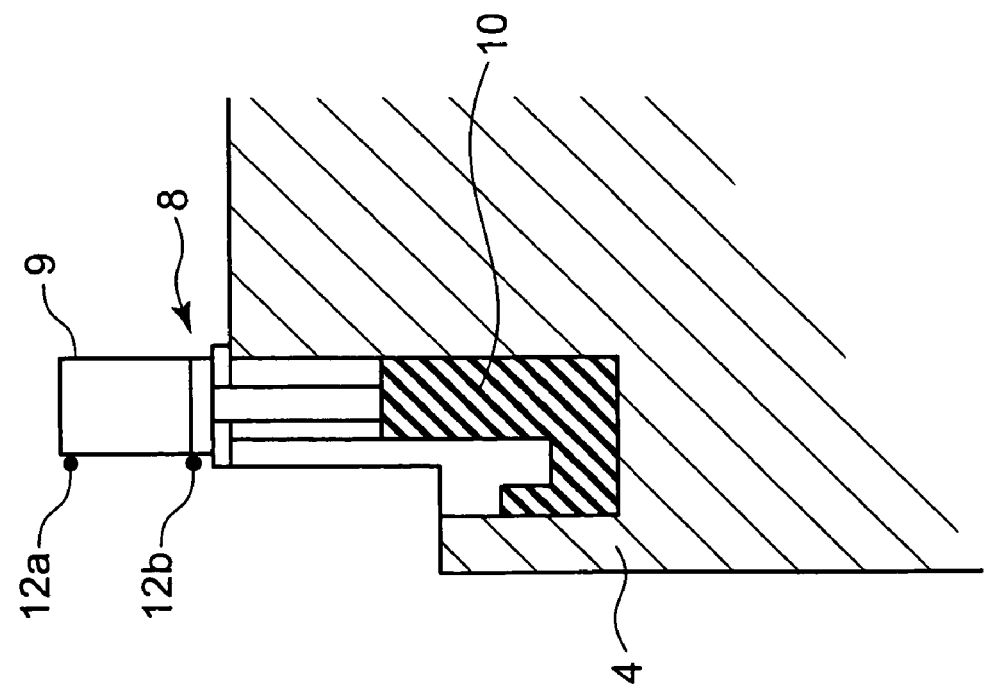
FIG.2B
FIG.2A

METHOD AND APPARATUS FOR ELECTRIC CLAMPING

BACKGROUND OF THE INVENTION

1. Field of the Invention

The present invention relates to a method for electric clamping using a die casting machine, and particularly to a method for electric clamping using a die casting machine equipped with a mold having a core.

2. Background Art

In the past, molding which utilizes a core has been widely used in the field of injection molding machines and die casting machines. In the case of setting a core in a mold, there is an issue on the relation to the clamping process. Conventionally, methods of performing a core-drawing-in process, i.e., a process in which a core is drawn into a mold, before or after the clamping process, or otherwise methods of performing the clamping process in parallel with the core-drawing-in process have been known.

In the former methods, while a safe and secure clamping operation can be provided, the clamping process and the core-drawing-in process must be arranged in series, leading to lengthen the cycle time of the molding. On the other hand, in the latter methods, the cycle time can be shortened since the claming process and the core-drawing-in process are performed in parallel with each other, thereby enhancing the productivity.

However, in the latter methods, when the core-drawing-in process is complicated, the core, the mechanism to draw the core into the mold, or the mold itself may be damaged unless the core-drawing-in process has completed before the final mold closing step of the clamping process.

For improving efficiency of the clamping process in the die casting machines, or for prevention of the damages of the mechanism of die casting machines, molds and cores to be used, various improvements are needed.

In particular, in a die casting machine including an electric clamping unit using a servo-motor, compatibility of speedup of the clamping operation, i.e., enhancement of the productivity and efficiency, and ability to perform the clamping operation and the core-drawing-in process in parallel, are further required.

To address this situation, the technology of preventing the above-mentioned damages using various detectors has been known in the field of die casting machines. For example, in Japanese Patent Application No. 1995-88616, an example of mechanisms for preventing galling of an ejector pin, which uses a pressure sensor, is described.

SUMMARY OF THE INVENTION

It is an object of the present invention to achieve the compatibility of making an efficient electric clamping process using a die casting machine, and security of the core-drawing-in process to be performed in parallel with the clamping process.

The present invention was made to achieve the above-described object, and provides a method and a apparatus for electric clamping using a die casting machine, which performs the clamping process in parallel with the core-drawing-in process such that the core-drawing-in process can be completed securely without damaging the mechanisms of the mold and core.

In order to accomplish the objects, a method for electric clamping using a die casting machine provided with a clamping unit having a fixed mold and a movable mold for forming a cavity together, and a core system for reciprocating a core between a retreating position and a position in which the core is fully drawn into the cavity using an actuator provided on the movable mold; and the clamping unit driven by a servo-motor to reciprocate the movable mold through a predetermined stroke and clamp the two molds together; the method performing a core-drawing-in process in which a core is drawn into a cavity in parallel with a clamping process in which the two molds are closed and clamped together, and the method comprises the steps of setting a check point, for judging safety of the clamping process in advance, at a position that is nearer to the operational start position by a predetermined distance in the mold opening direction than a position of the movable mold when an operation to draw the core into the cavity is expected to be completed, wherein the core-drawing-in process and the clamping process proceed in parallel with each other in a straight course for reciprocating the movable mold; activating the core system and the servo-motor to start the operation to draw the core into the cavity in parallel with an operation to move the movable mold in the mold closing direction; detecting whether or not the movable mold reaches the check point; judging whether or not the core reaches the position in which the core is fully drawn in the cavity at a point of time at which the movable mold reaches the check point, and confirming the completion of the core-drawing-in process; and further continuing the clamping process of the molds if confirming that the core-drawing-in process is already completed.

According to the present invention, a check point is provided in the course of closing a mold in the clamping process, and the clamping process is continued while confirming the safety detected by a signal obtained from the check point. Thus, shortening the molding cycle time in the clamping process due to high speed opening and closing of the mold utilizing a feature of the electric clamping unit can be attained, as well as, damages of the clamping mechanism of the die casting machine, and the mechanisms of the mold and core due to premature clamping occurring before completion of the core-drawing-in process can be securely prevented.

BRIEF DESCRIPTION OF THE DRAWINGS

FIG. 2 is a cross-section of a mold showing a core used in the clamping unit.

DETAILED DESCRIPTION OF THE INVENTION

A first embodiment of the present invention will be described in terms of a clamping method using an electrically-driven die casting machine with reference to FIGS. 1 to 4.

Figure 1:
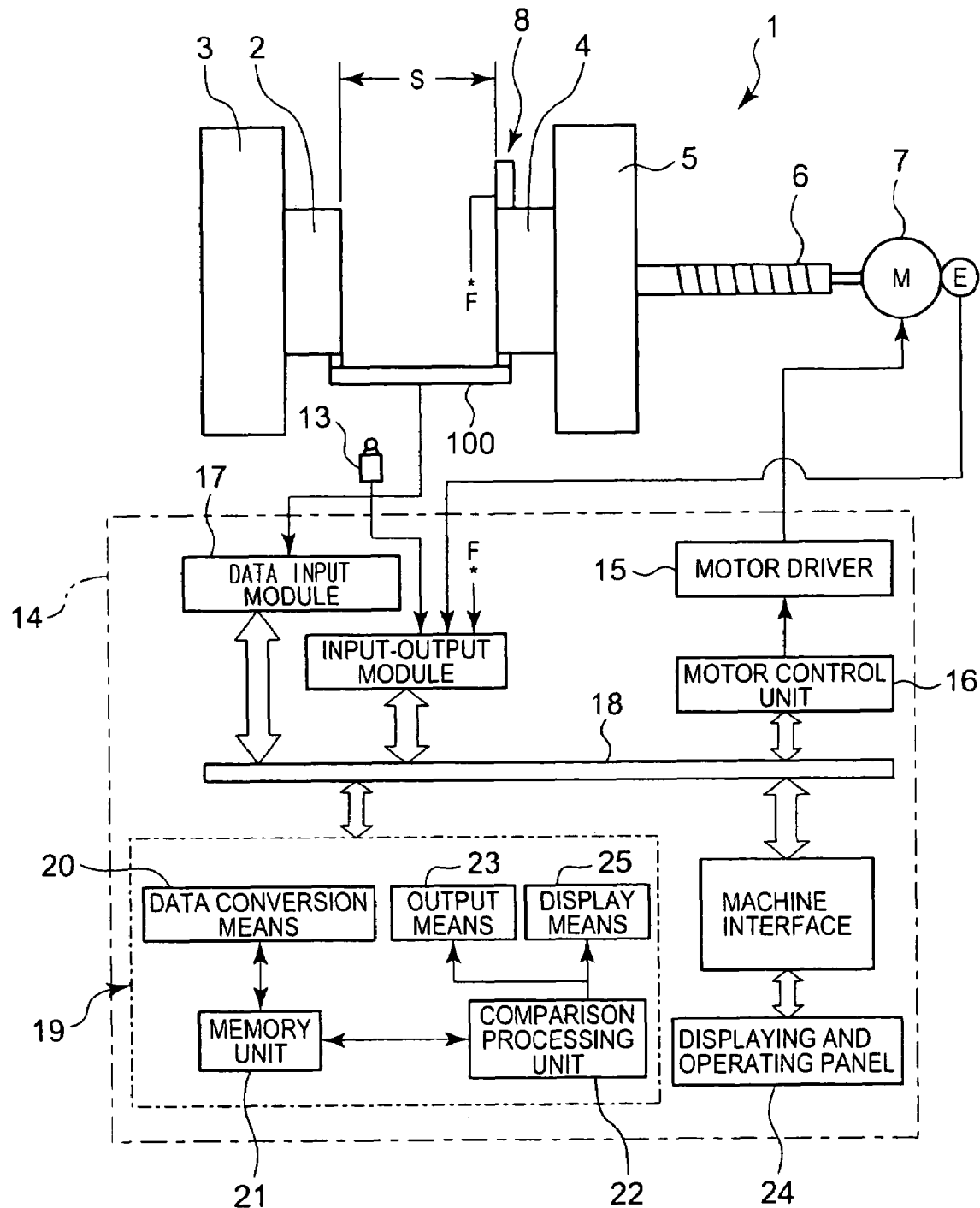
FIG. 1 is a diagram showing a clamping unit and a control device in a die casting machine according to the present invention.

In FIG. 1, reference numeral 1 denotes an electric clamping unit used in a die casting machine. A fixed mold 2 is attached to a stationary die plate 3, and a movable mold 4 is attached to a movable die plate 5. A cavity 11 is formed between the front mold 2 and the movable mold 4 (see FIG. 2). The clamping unit 1 is driven by a servo-motor 7. The movable die plate 5 to which the movable mold 4 is attached is coupled to a ball screw shaft 6. The ball screw shaft 6 is rotated by the servo-motor 7, and this rotation of the ball screw shaft 6 is converted by a not-shown ball screw mechanism in combination with a ball nut into a linear reciprocation of the movable die plate 5 having a stroke S. In FIG. 1, the movable mold 4 is in a start position of a clamping process, and the stroke S corresponds to a distance between the start position and an end position of the clamping process.

Also in FIG. 1, reference numeral 8 designates a core system for setting a core at a predetermined position of the cavity 11. The core system 8 is attached to the movable mold 4. As shown in FIG. 2, the core system 8 includes a hydraulic cylinder 9 as an actuator which causes a core 10 to move into or out of the molding cavity 11. On the hydraulic cylinder 9 are provided proximity switches 12a, 12b as sensors for detecting the position of the core 10 moving into or out of the cavity 11. Also in FIG. 2, (a) designates a position of the core 10 when the clamping process is started. At this time, the core 10 is in a retreating position in the movable mold 11. In such a situation, the switch 12b is turned ON. Contrary, (b) denotes a position in which the core 10 is fully drawn into the cavity 11 and its travel is ended. In this situation, the switch 12a is turned ON.

As shown in FIG. 1, reference numeral 13 denotes a switch which is positioned at a check point for confirming the safety of the clamping process prior to performing it in parallel with the core-drawing-in process. Namely, the switch 13 detects that the movable mold 4 reaches the check point. For example, this switch 13 is composed of a limit switch and provided in the course of the stroke S.

Figure 3:
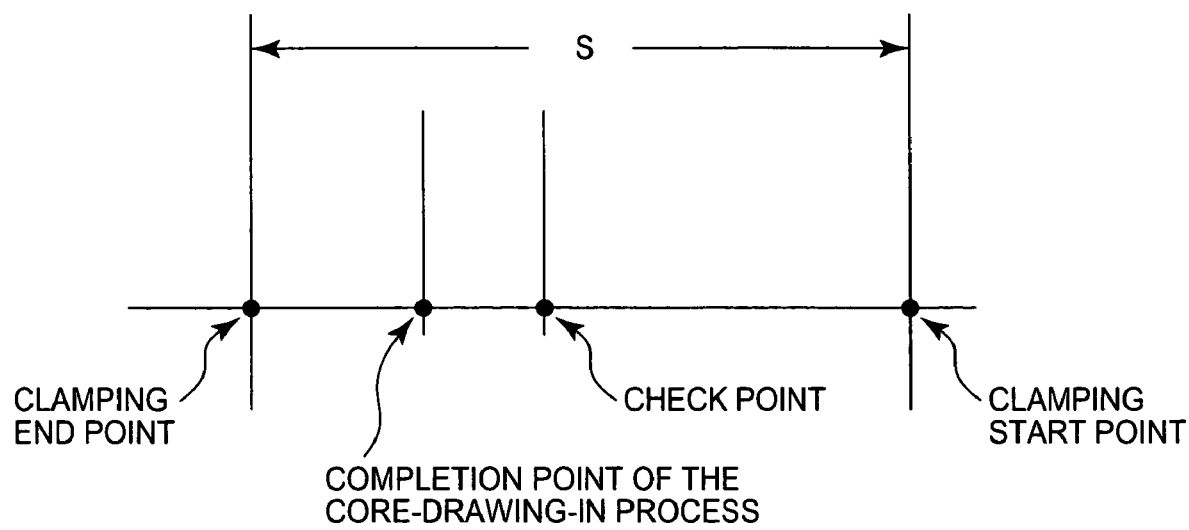
FIG. 3 is a schematic view showing a relation of a check point in a travel course of a movable mold, a clamping start point, a clamping end point, and a completion point of the core-drawing-in process.

FIG. 3 illustrates a setting position of the check point in the stroke S of the movable mold 4.

In FIG. 3, a position A is a start position of the movable mold 4 in which the clamping process is stated. A position B is a final position of the movable mold 4 in which the clamping process is completed. A position C is the above-mentioned check point. This check point C is set at a position that is nearer to the start position A by a predetermined distance (in the mold opening direction) than a position D of the movable mold 4 at a point of time at which the core-drawing-in process is expected to be completed. The time the core-drawing-in process is completed refers to the time the operation of drawing the core 10 into the cavity 11 by the hydraulic cylinder 9 of the core system 8 is ended. Such a position of the check point C is set at a suitable position in advance based on properties of mechanical and/or electrical components for driving the electric clamping unit, such as the servo-motor 7, ball screw shaft 6, types of the core 10, hydraulic cylinder 9 and the like. Accordingly, the position of "the check point C" may vary with types and sizes of the mechanical components and the mold to be used. Therefore, differences among the die casting machines and also differences among the molds to be used even in the same die casting machine may change the position of the check point C.

In this way, "the position D in which the core-drawing-in process is expected to be completed" and "the check point C" are set as positions shown in FIG. 3, respectively, in the course of the clamping stroke S of the electric clamping unit. The state where the movable mold 4 reaches the check point C is detected by the switch 3. In this case, changing the setting point of the switch 13 allows the positioning of the check point C advantageously corresponding to alterations of molds and cores.

For the electric clamping unit 1 of this embodiment, as shown in FIG. 1, operational control of opening and closing the mold and of the clamping is performed by a control device 14. The servo-motor 7 is connected to a motor control unit 16 specially used for the servo-motor 7 via a motor driver 15. The angular rotation of the servo-motor 7 is detected using an encoder E which is associated with the servo-motor 7. The output of the encoder E is fed back to the motor control unit 16, then this unit 16 moves the movable mold 4 while controlling the rotation of the servo-motor 7 based on the feedback. During the movement of the movable mold 4 in the clamping process, the aforementioned positions C and D shown in FIG. 3 will be detected by the switch 13 and a linear scale 100.

In this embodiment, the data of the movable die plate 5 or the positional data of the movable mold 4 set in the movable die plate 5 is processed by the control device 14 in the following procedure. In this case, the same effect can be obtained to detect the position of the movable die plate 5 rather than detecting the position of the movable mold 4. Therefore, the detection of the position of movable die plate 5 will be described here as one example.

The positional data detected by the linear scale 100 are transferred to a locating module 17 in the control device 14, and then received in a data conversion means 20 in a positional detection unit 19 surrounded by a dotted line through a bus 18. The data conversion means 20 converts the positional data into time series data, and the converted data are stored in a memory unit 21 and then updated for a predetermined cycle.

A comparison processing unit 22 is capable of transmitting data to the memory unit 21. The memory unit 21 is configured to store various data. The data include, for example, timer data necessary for the sequence control of a die casting machine including a clamping process and a core process, positional data when an ON signal from the switch 13 for checking positions is detected, a data group of the elapsed time Tn from the start point A in the course of the preset stroke S, a data group of travel distances Sn of the movable die plate 5 over the elapsed time, the time tn required from the start to completions of the core-drawing-in process, the elapsed time ti form the start of the core-drawing-in process, the ordered speed or number of revolution of the motor and the like.

The comparison operation unit 22 can read various data stored in the memory unit 21, and perform various comparison operations. When the switch 13 for detecting the position of the check point C is turned ON, the following data are read or calculated as data necessary for confirming the safety of the clamping process.

Predicted travel time T is the time to be predicted for the movable die plate 5 to move from a point of time at which the switch 13 is turned ON to the end of the core-drawing-in process. Operational remaining time t of the core system 8 is the time required for the operation of the core system 8 from the point of time at which the switch 13 is turned ON to the completion of the core-drawing-in process. Namely, the operational remaining time t can be obtained by storing the total time tn required from start to completion of the core-drawing-in process in advance in the memory unit 21 and then calculating it as a remaining time obtained by subtracting from the total time tn the elapsed time from the start of operation to the point of time at which the switch 13 is turned ON.

The predicted travel time T can be calculated in various ways. For example, in the clamping process, based on the data of the number of revolution of the servo-motor 7, structural characteristic values of the ball screw shaft 6 and the like at the point of time at which the switch 13 for setting the position of the check point C is turned ON, and on the total time tn required from start to completion of the core-drawing-in process, the time T predicted for the movable die plate 5 to reach a stop position can be calculated by predicting and estimating the travel distance of the movable die plate 5 from the check point C to the end point of the core-drawing-in process.

Alternatively, actually measured data may be stored as the predicted travel time T in advance in the memory unit 21 to read them when needed. Thus, the comparison of such predicted time T with the total time tn required from the start to end of the core-drawing-in process may also be used to obtain the remaining time t. Otherwise, the remaining time t may be calculated from the travel distance of the movable die plate 5 detected by the linear scale 100 up to the point of time at which the ON signal generated from the switch 13 at the check point C is received. Namely, various methods may be used for obtaining or calculating the predicted time T and the remaining time t.

When comparing the predicted travel time T to the remaining time t of the core-drawing-in operation, and if a judgment is given that the predicted travel time T is longer than the operational remaining time, it can be believed that the core-drawing-in process will be ended earlier than reaching the predicted travel time T. In FIG. 3, the travel of the core is already completed before the movable die plate 5 reaches the expected position D in which the core-drawing-in process is expected to be completed. In this case, since there is no issue on the safety if further continuing the clamping, an order for continuing the clamping is transmitted from an output means 23 via the bus 18 to the motor control unit 16 of the servo-motor 7. Consequently, the rotation of the servo-motor 7 is continued, and the movable die plate 5 thus continues to move up to the end of the clamping.

Contrary, if a judgment is given that the predicted travel time T is shorter than the remaining time t of the core-drawing-in operation, it can be considered that the core-drawing-in operation will not be ended even when the movable die plate 5 reaches the expected position D in which the core-drawing-in process is expected to be completed. In such a case, if the clamping would be further continued, the movable mold 4 abuts the fixed mold 2 leaving the core-drawing-in operation uncompleted, and they would be clamped together with a significantly great force. Accordingly, in this case, an order for reducing the rotational speed of the servo-motor 7 or for stopping the rotation of the servo-motor 7 is transmitted to the motor control unit 16. The numbers of rotation to reduce the rotational speed of the servo-motor 7 or the like data is stored in advance in the memory unit 21. In addition, the information of the reduction of the rotational speed of the servo-motor 7 or stopping its rotation can be displayed by means of a display means 25 on a display screen of a displaying and operating panel 24 via the bus 18.

The start and end points of the core-drawing-in process can be detected based on a signal (signal F in FIG. 1) which is detected by the detecting switches 12a, 12b provided on the hydraulic cylinder 9. The signal F is transmitted to the locating module 17 residing in the control device 14 and thereafter received in the positional detection unit 19 surrounded by a dotted line via the bus 18. Then, each of the elapsed times t1, t2, t3, . . . , tx from the start point (the point of time at which the switch 12a is changed from ON to OFF) of the core-drawing-in process is counted by the comparison operation unit 22 provided with a timer. In such a manner, the remaining time t in the process may also be calculated using the elapsed time taken for reaching the check point C and the time tn required for completing the process. Additionally, the judgment whether or not the core-drawing-in process has been ended can be made by the detection of the change from ON to OFF of the signal from the switch 12a.

Figure 4:
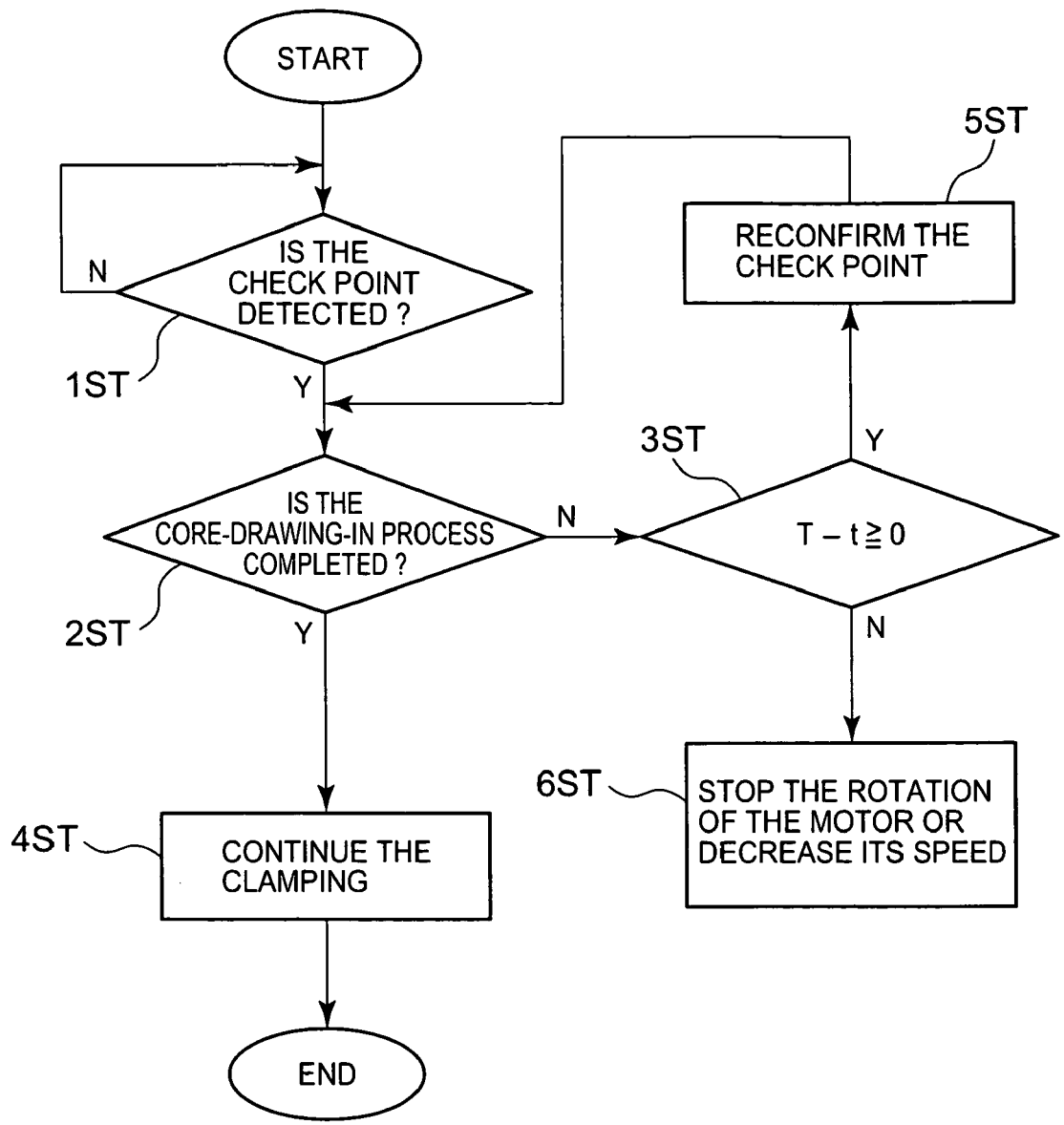
FIG. 4 is a flow chart showing an order of the steps of the clamping method according to the present invention.

Next, referring to FIG. 4, the electric clamping process according to the present invention will be described using a flow chart based on various judgments at the control device 14 and the comparison operation unit 22.

Initially, both of the clamping process and the core-drawing-in process are started, and then proceed in parallel with each other. First, in Step 1, whether or not the movable die plate 5 has reached the check point C is judged by the comparison operation unit 22. In this case, the arrival is decided if the change from OFF to ON of the signal of the switch 13 is detected. If No, since the movable die plate 5 is still moving before the check point, the operator waits the arrival of the movable die plate 5.

If Yes in the Step 1, the procedure goes to Step 2 in which the judgment whether or not the core-drawing-in process has been completed is provided. If the ON signal of the switch 12b has been detected, the core-drawing-in process has been completed. Then, the procedure goes to Step 4. In the Step 4, since there is no issue on the safety because the core has been fully drawn into the cavity, the clamping can be further continued.

If No in the Step 2, or if the core-drawing-in process is not yet completed, the procedure proceeds to Step 3 in which is carried out comparison between the predicted travel time T for the movable mold 4 from its reaching the check point to the completion of the core-drawing-in process to the operational remaining time t of the core system. As a result, if T−t is equal to or larger than zero (0), the procedure will go to Step 5 in which for caution's sake, the confirmation of the arrival at "the check point" is performed once again. However, in this stage, it is already sure that the core-drawing-in process is completed earlier than the point of the predicted travel time T. Then, reconfirmation of "the completion of the core-drawing-in process" is carried out again in the Step 2. Through such a dual confirmation for the safety, the procedure then proceeds to Step 4 where the clamping is further continued.

If No in the Step 3, since there is a risk that the movable mold 4 may abut the fixed mold 2 leaving the core not fully drawn into the cavity and they may be clamped together with an uncompleted relation therebetween, the procedure goes to Step 6. In the Step 6, in order to avoid the risk of damaging structural mechanisms including the molds due to the rotation of the motor, the servo-motor 7 is stopped or its rotational speed is decreased to discontinue the clamping process.

As stated above, the above-mentioned embodiment enables performing the clamping operation and the core-drawing-in operation in parallel with each other with a significant safety in an electric clamping process using a servo-motor, providing compatibility of shortening the molding cycle due to a high speed travel, which is a feature of the electric clamping unit, and a secure core-drawing-in process without damaging related structural mechanisms.

As a variation of the above embodiment, rather than measuring the position of the movable die plate 5 or movable mold 4 using the linear scale 100, a signal of the encoder E used for controlling the clamping servo-motor 7 may be used for the detection of the position of the movable die plate 5 or movable mold 4.

In the case of the control based on the position of the movable die plate 5 or movable mold 4 to be detected by the signal from the encoder E, the position of the check point C may be stored in advance in the memory unit 21 rather than using the switch 13.

Using an absolute-value type encoder as the encoder E described above enables direct detection of the position of the movable die plate 5 through simple data conversion using the data conversion means 20. Thus, this method appears to be easier acquisition of the positional data as compared to using incremental type encoders.

In the previously described embodiment, while the check point is stored in the memory unit 21 as a certain position in the course of the stroke S, this check point may be stored therein as time data related to a specific point of time in the course of one cycle time from the start to end of the clamping process. In this case, the check point is set at a point of time defined earlier than that of the completion of the core-drawing-in operation. Consequently, the point of time of the check point can be compared directly and in advance to the time required for the clamping or the time the core-drawing-in process is completed, thus providing significantly easier calculations of the predicted travel time T up to the end of the core-drawing-in process and the remaining time t up to the completion of the core-drawing-in operation.

What is claimed is:

1. A method for electric clamping using a die casting machine provided with a clamping unit having a fixed mold and a movable mold for forming a cavity together, and a core system for reciprocating a core between a retreating position and a position in which the core is fully drawn into the cavity using an actuator provided on the movable mold; and the clamping unit driven by a servo-motor to reciprocate the movable mold through a predetermined stroke and clamp the two molds together; the method performing a core-drawing-in process in which a core is drawn into a cavity in parallel with a clamping process in which the two molds are closed and clamped together, and the method comprising the steps of:

setting a check point, for judging safety of the clamping process in advance, at a position that is nearer to the operational start position by a predetermined distance in the mold opening direction than a position of the movable mold when an operation to draw the core into the cavity is expected to be completed, wherein the core-drawing-in process and the clamping process proceed in parallel with each other in a straight course for reciprocating the movable mold;

activating the core system and the servo-motor to start the operation to draw the core into the cavity in parallel with an operation to move the movable mold in the mold closing direction;

detecting whether or not the movable mold reaches the check point;

judging whether or not the core reaches the position in which the core is fully drawn in the cavity at a point of time at which the movable mold reaches the check point, and confirming the completion of the core-drawing-in process; and further continuing the clamping process of the molds if confirming that the core-drawing-in process is already completed.

2. The method according to claim 1, wherein the step of confirming the completion of the core-drawing-in process further comprises the steps of:

obtaining a predicted travel time T to be predicted for the movable mold to travel until the completion of the core-drawing-in process when the core-drawing-in process is not yet completed, and an operational remaining time t of the core system from a point of time at which the movable mold reaches the check point to the completion of the core-drawing-in process; and comparing the predicted travel time T to the operational remaining time t, and if the predicted travel time T is longer than the operational remaining time t, reconfirming whether or not the core has moved to the position in which it is fully drawn into the cavity.

3. The method according to claim 2, wherein if the comparison of the predicted travel time T to the operational remaining time t gives a result that the predicted travel time T is shorter than the operational remaining time t, the movement of the movable mold is stopped or the moving speed is decreased.

4. The method according to claim 2, wherein if the comparison of the predicted travel time T to the operational remaining time t gives a result that the predicted travel time T is longer than the operational remaining time t, the step of reconfirming the completion of the core-drawing-in process is performed after a step of reconfirming that the movable mold has reached the check point.

5. The method according to claim 1, wherein the check point is set as a specific point of time defined earlier than the point of time at which the operation to draw the core into the cavity is completed in the course of one cycle time from the start to end of the clamping process, rather than setting the check point as a position in the course of the travel.

6. An electric clamping apparatus for a die casting machine provided with a fixed mold and a movable mold for forming a cavity together, and a core system for reciprocating a core between a retreating position and a position in which the core is fully drawn into the cavity using an actuator provided on the movable mold, and the clamping unit driven by a servo-motor to reciprocate the movable mold through a predetermined stroke and clamp the two molds together; and the apparatus comprising:

a check point setting means for setting a check point, for judging safety of the clamping process in advance, in a position that is nearer to the operational start position by a predetermined distance in the mold opening direction than a position of the movable mold when the core-drawing-in process is expected to be completed, wherein the core-drawing-in process and the clamping process proceed in parallel with each other in a straight course for reciprocating the movable mold;

a core positional detection means for detecting whether or not the travel of the core to the position in which the core is fully drawn into the cavity is completed;

a motor control means for controlling the operation of the servo-motor in cooperation with the core system;

a safety judgment means for judging whether or not the core reaches the position in which the core is fully drawn into the cavity at a point of time at which the movable mold reaches the check point, and permitting further continuation of the servo-motor's rotation if confirming that the core has moved to the position in which the core is fully drawn into the cavity.

7. The electric clamping apparatus according to claim 6, wherein the safety judgment means comprises:

a means for calculating a predicted travel time T to be predicted for the movable mold to move until the completion of the core-drawing-in process when the core-drawing-in process is not yet completed, and an operational remaining time t of the core system from a point of time at which the movable mold reaches the check point to the completion of the core-drawing-in process, and comparing the predicted travel time T to the operational remaining time t; and wherein if the predicted travel time T is longer than the operational remaining time t, the rotation of the servo-motor is continued after reconfirming that the core has moved to the position in which the core is fully drawn into the cavity.

8. The electric clamping apparatus according to claim 7, wherein the safety judgment means transmits a signal for stopping the servo-motor or a signal for decreasing its speed to the motor control means if the comparison of the predicted travel time T to the operational remaining time t gives a result that the predicted travel time T is shorter than the operational remaining time t.

9. The electric clamping apparatus according to claim 6, wherein the check point setting means comprises a linear scale arranged along the course of the travel of the movable mold to detect the position of the movable mold, and a positional detection switch for setting the position of the check point.

10. The electric clamping apparatus according to claim 6, wherein the check point setting means comprises an absolute-type encoder which outputs a rotational angular amount of the servo-motor, a data conversion means for converting data outputted from the encoder into a position of the movable mold, and a memory device for storing positional data representing the check point.

11. The electric clamping apparatus according to claim 6, wherein the check point setting means includes a memory device which stores the check point as a specific point of time defined earlier than the point of time at which the operation for drawing the core into the cavity is completed in the course of one cycle time of the clamping process.

12. The electric clamping apparatus according to claim 6, wherein the core positional detection means comprises positional detection switches provided on a cylinder of the actuator corresponding to the wait position and the position in which the core is fully drawn into the cavity, respectively.

* * * * *